United States Patent
Taniguchi et al.

(10) Patent No.: US 6,338,024 B1
(45) Date of Patent: Jan. 8, 2002

(54) INDUSTRIAL MACHINE HAVING ABNORMAL VIBRATION DETECTING FUNCTION

(75) Inventors: Mitsuyuki Taniguchi, Gotenba; Hirofumi Kikuchi, Yamanashi, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/287,620

(22) Filed: Apr. 7, 1999

(30) Foreign Application Priority Data

Apr. 7, 1998 (JP) .......................... 10-111551

(51) Int. Cl.⁷ .................. G06F 19/00; G01H 17/00; G05B 11/00
(52) U.S. Cl. .................. 702/56; 702/35; 318/560; 318/638; 318/676; 73/570; 73/593
(58) Field of Search .................. 702/56, 33–35; 318/560, 565, 625, 638, 652, 671, 676–677; 73/570, 660–661, 662, 581, 593

(56) References Cited

U.S. PATENT DOCUMENTS

| | | | |
|---|---|---|---|
| 4,503,372 A | * | 3/1985 | Nozawa et al. ............. 318/560 |
| 5,412,302 A | * | 5/1995 | Kido et al. ................. 318/632 |
| 5,525,885 A | * | 6/1996 | Sato ........................... 318/560 |
| 5,637,973 A | * | 6/1997 | Hirai et al. ................. 318/640 |

FOREIGN PATENT DOCUMENTS

| | | |
|---|---|---|
| JP | 56-76361 | 6/1981 |
| JP | 57-172218 | 10/1982 |
| JP | 59-53146 | 3/1984 |
| JP | 62-74553 | 4/1987 |
| JP | 62-271626 | 11/1987 |
| JP | 3-71842 | 7/1991 |
| JP | 5-69279 | 3/1993 |

\* cited by examiner

Primary Examiner—Marc S. Hoff
Assistant Examiner—Bryan Bui
(74) Attorney, Agent, or Firm—Staas & Halsey LLP

(57) ABSTRACT

An industrial machine in which vibration exerted on a position detector provided for an axis of the machine is detected and countermeasures against the vibration can be swiftly taken. A ball screw is driven by a servo motor MZ supplied with power from a servo amplifier via a power line so that a cutting unit is advanced and retracted. A spindle motor MS above the cutting unit rotates a cutting tool via a spindle shaft and a workpiece W on an XY table is machined. An acceleration detection element is built in a position detector attached to a motor shaft of the servo motor MZ. An angle detection signal for servo control and a vibration level signal outputted by the acceleration detection element are converted into serial signals and are transmitted to a controller (axis control circuit of Z-axis) via the common signal line. The controller takes measures of changing the machining condition (for example, change of spindle rotational speed) and stopping the machine in accordance with a rank of the vibration. A duration or total time period of the abnormal vibration may be monitored.

18 Claims, 8 Drawing Sheets

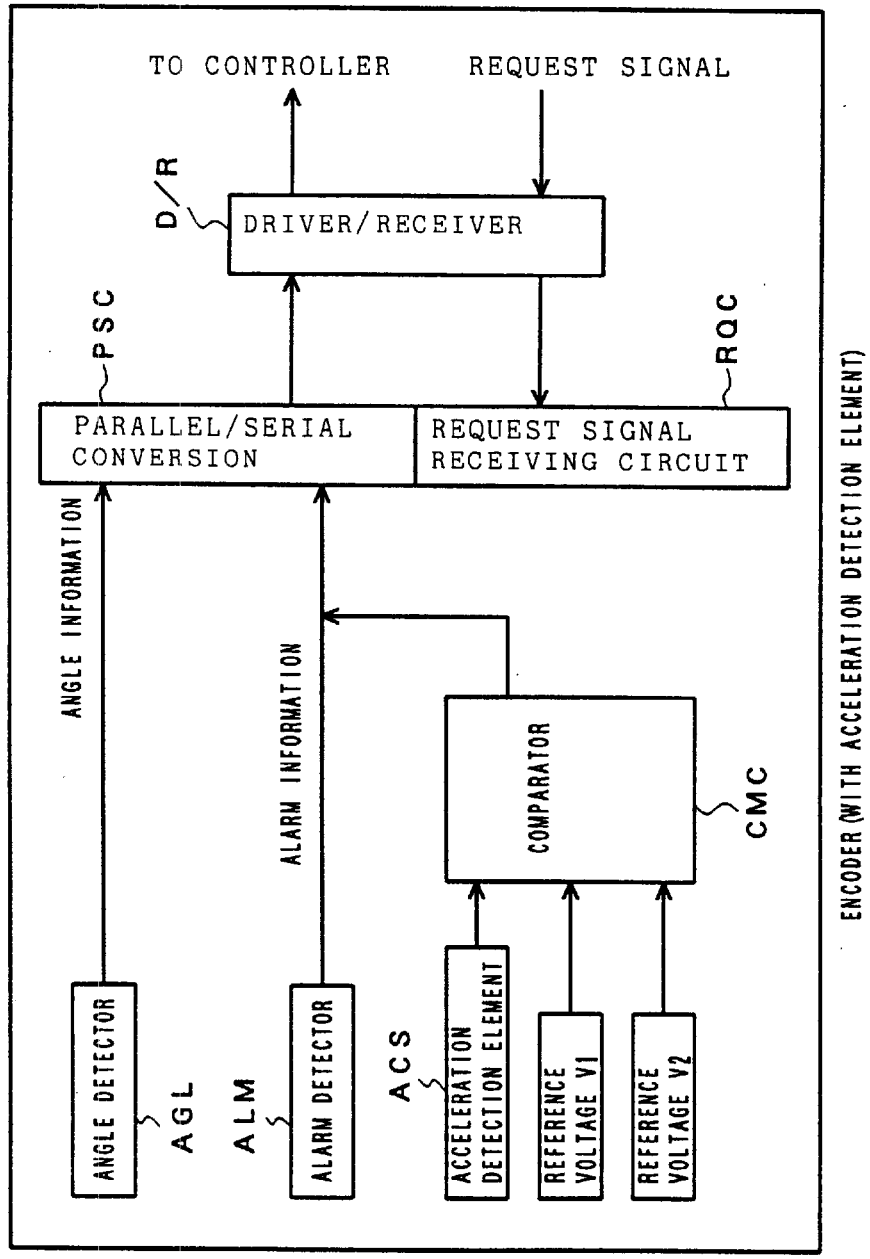
F I G. 5

F I G. 7
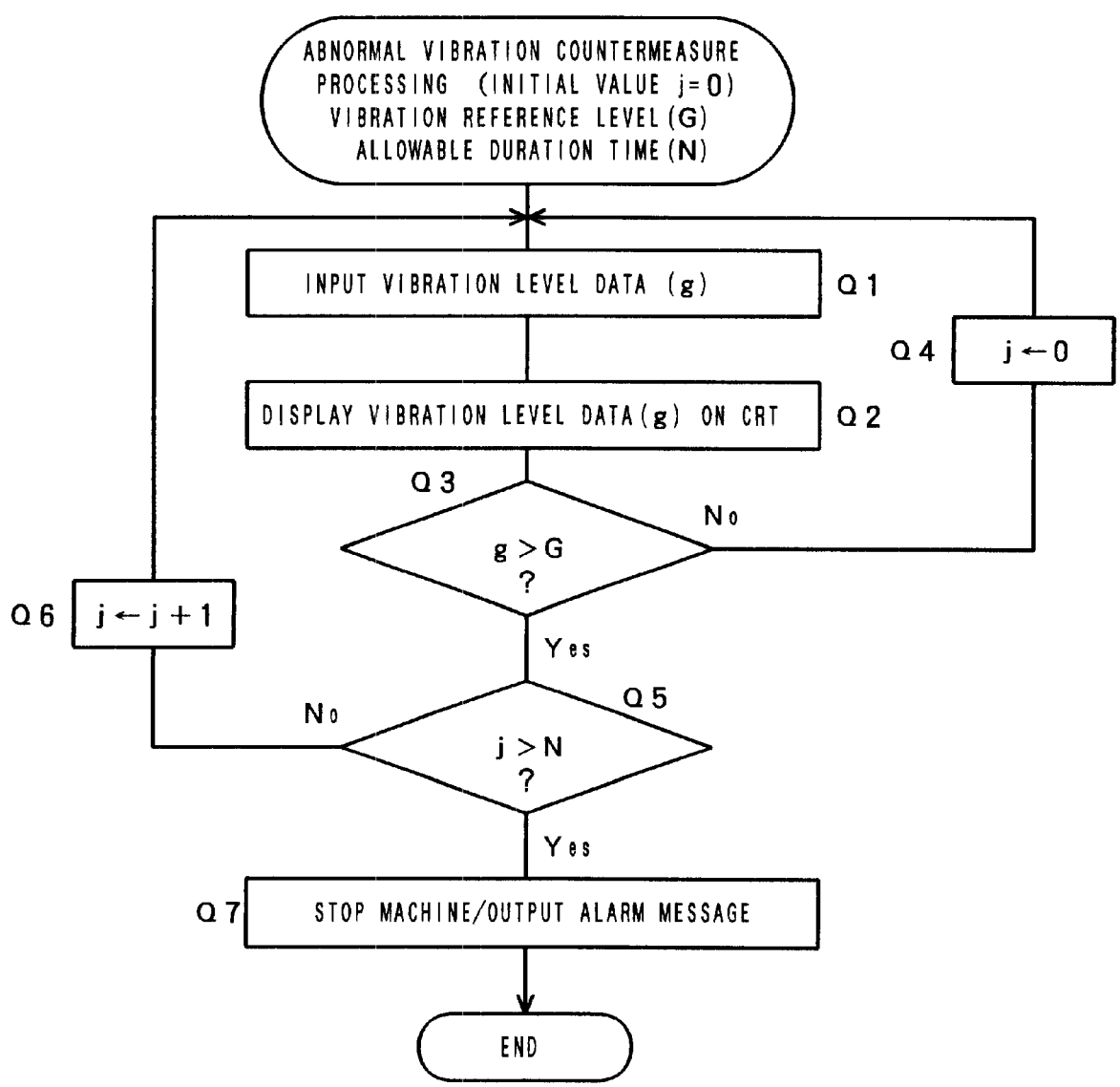

F I G. 8
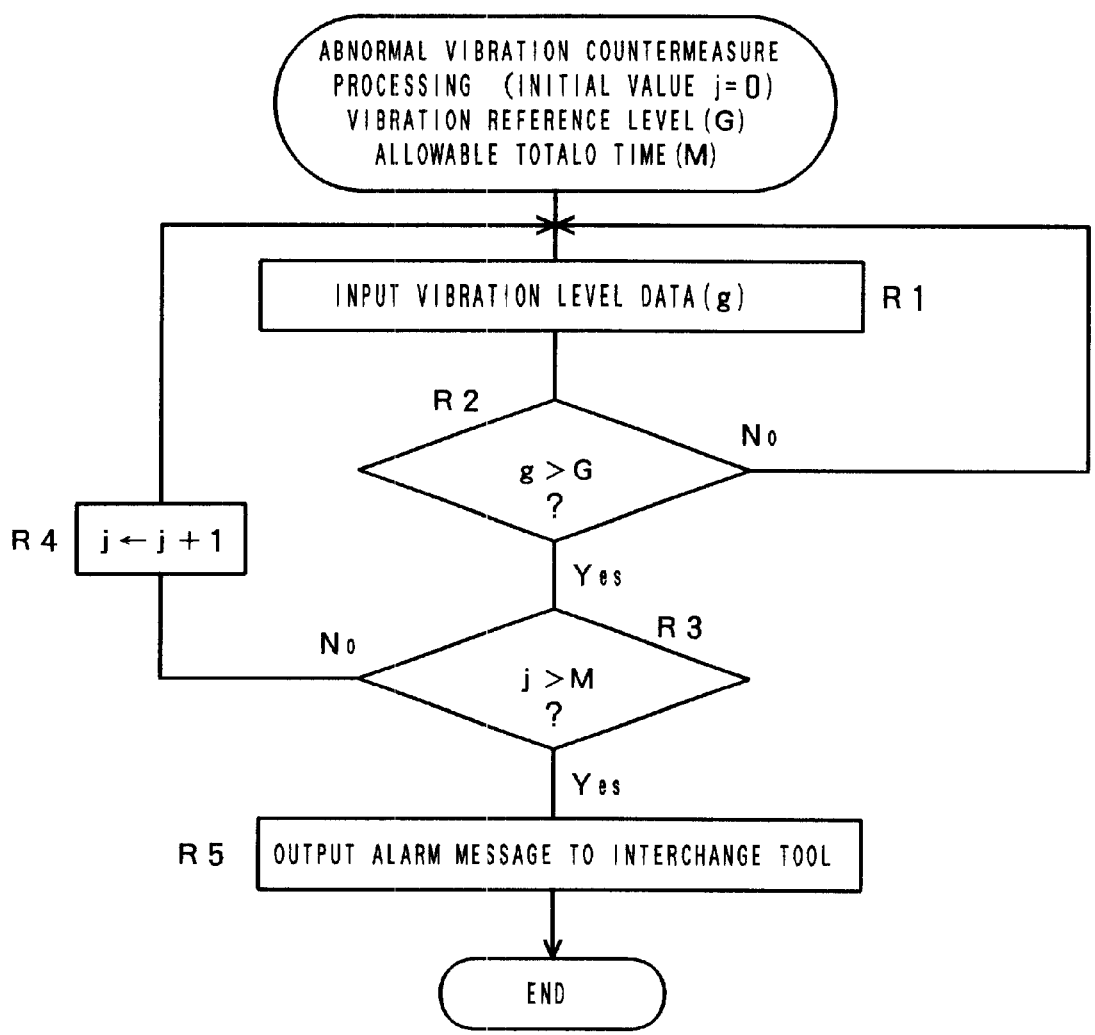

INDUSTRIAL MACHINE HAVING ABNORMAL VIBRATION DETECTING FUNCTION

BACKGROUND OF THE INVENTION

1. Field of the Invention

The present invention relates to an industrial machine having an abnormal vibration detecting function, and more particularly to an industrial machine taking a countermeasure against abnormal vibration exerted on a position detector provided for servo control of a movable part of the industrial machine.

2. Description of the Related Art

In various kinds of machines, vibration is caused with a machining operation by a machining tool such as a cutting tool or with driving of a table. Some vibration of a machine is caused even when the machine is normally operated, and a level of the vibration is usually increased when an abnormality is caused or is going to be caused in a machine. For example, when wear of a tool tip has progressed, destruction such as crack has occurred or is going to occur in a tool tip, or a machining condition is improper (for example; a rotational speed of a spindle is excessively large), abnormal vibration occurs.

Normally, an operator recognizes the abnormal vibration by abnormal sound or the like and takes necessary measure such as stopping a machine, checking it or interchanging a tip. However, it is difficult even for a skilled operator to firmly recognize occurrence of abnormal vibration at an early stage and take appropriate measure and it depends on intuition of an operator.

Further, when there causes a situation in which a vibration level is rapidly increased by destruction such as chipping off of a tool tip, an operator is liable to be delayed in dealing therewith. Particularly, in the case in which there is a cause of occurrence of abnormal vibration in a peripheral portion (for example, motor, reduction gear) of a position detector (typically, pulse coder), if the abnormal vibration is left, adverse influence is effected on the position detector, machining accuracy is deteriorated owing to abnormal operation of the position detector and in an extreme case, destruction of the position detector is resulted. Further, there is a case in which a position detector per se constitutes a source of abnormal vibration and in such a case, there is needed a countermeasure of stopping a machine as early as possible.

As a technology for a countermeasure against abnormal vibration of a machine, there has been known a technology in which machining sound caused in, for example, a machine tool is sensed and destruction of a tool tip is predicted based on the result (refer to Japanese Laid-open Patent Publication No. 212656). However, according to the technology, the prime object is prediction of destruction of a machining tool and is not a countermeasure paying attention to influence of vibration which a position detector undergoes.

Generally, a position detector such as a pulse coder is a sensitive precision device in which deviation or destruction is liable to occur by strong vibration. Further, an abnormality in operation of a position detector by deviation or destruction thereof effects adverse influence directly on machining accuracy of a machine and an abnormal output of signal (feedback signal) may cause malfunction. Even in a system for detecting abnormality of machining sound without particularly taking account of a position detector as in the above-described known technology, influence of vibration on a position detector is indirectly taken into consideration to some degree, but abnormal vibration occurred in a position detector per se or its peripheral portion can not necessarily be detected as abnormality of machining sound and may cause delay of taking the countermeasure.

SUMMARY OF THE INVENTION

It is an object of the invention to provide an industrial machine capable of precisely detecting vibration caused in a position detector provided at an axis of a machine and thereby swiftly taking a necessary measure. Further, the invention promotes reliability and safety of the machine controlled by a controller and minimizes economic loss by lowering a probability that the position detector reaches unrepairable destruction.

An industrial machine of the invention comprises a mechanical section driven by a servomotor or a spindle motor, and a control section for controlling the mechanical section. A vibration sensor is provided at the servomotor, a detector for detecting position or speed of the servomotor, or a mechanical portion connected with the servomotor or the spindle motor with respect to at least one axis driven by the servomotor or the spindle motor. Information representing the vibration obtained by a signal detected by the vibration sensor is transmitted to the control section.

The control section comprises determining means for determining whether or not a signal detected by the vibration sensor is an abnormal vibration based on the information included in a signal form the vibration sensor. The control section further comprises dealing means for taking measures against the abnormal vibration when the determining means determines that the abnormal vibration is detected.

Alternatively, the detector comprises determining means for determining whether or not the vibration detected by the vibration sensor is abnormal is provided at the detector for detecting position or speed of the servomotor, and the control section takes measures against an abnormal vibration based on the information included in the determination result by the determination means.

The countermeasure against the abnormal vibration includes typically measures of stopping the machine. Further, it is preferable to include a change of machining condition. With regard to the change of machining condition, a progressive change can be carried out. In that case, by changing the machining condition until abnormal vibration is detected, the countermeasure against the abnormal vibration is carried out.

The vibration sensor can be attached to a position detector for one axis or each of the position detectors for a plurality of axes, and in the case of a machine tool, it is preferable to attach the position detector to an axis for axially moving a tool in view of monitoring an environment of vibration of the position detector particularly liable to be subjected to influence of vibration caused in the vicinity of the tool.

In a typical embodiment, the determining means includes operation of comparing high or low of a detected vibration level with a reference level set to the control section. A result of determination may be derived immediately from the high or low comparison, or an allowable value may be provided in a duration time period or a total time period in which the vibration level exceeds the reference level, and a large or small comparison therewith may be carried out.

BRIEF DESCRIPTION OF THE DRAWINGS

FIG. 5 is a block diagram for explaining an outline of signal processing in respect of a pulse coder adopted in a third embodiment;

FIG. 7 is a flowchart describing an outline of a processing according to a fourth embodiment; and FIG. 8 is a flowchart describing an outline of a processing according to a fifth embodiment.

DETAILED DESCRIPTION OF THE PREFERRED EMBODIMENTS

Figure 1:
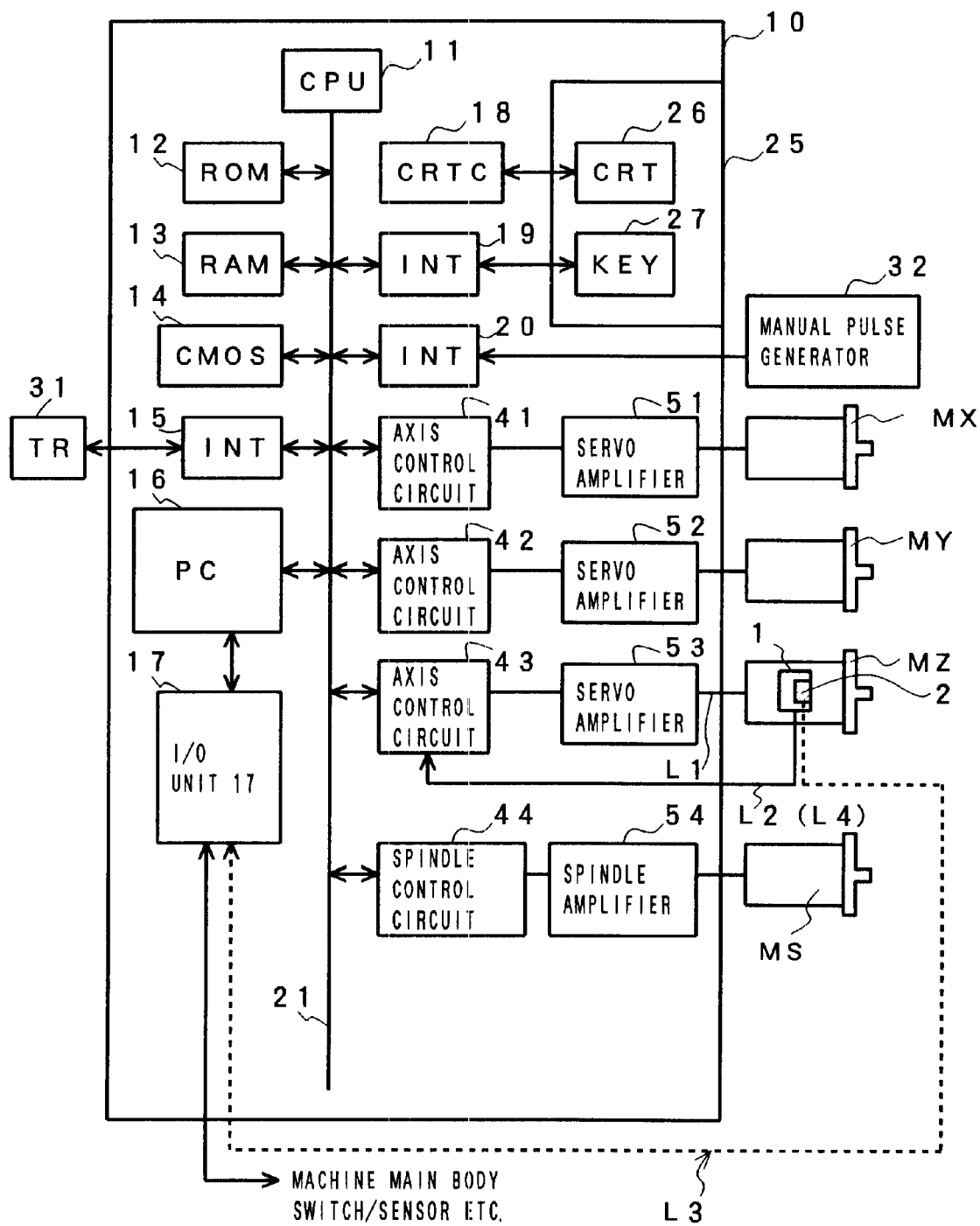
FIG. 1 is a block diagram of essential portions exemplifing arrangement of a controller and related portions for an industrial machine to which the invention is applied.

FIG. 1 is a block diagram exemplifying arrangement of a controller for an industrial machine to which the invention is applied. In the drawing, a controller designated by notation 10 is provided with a processor (main CPU (Central Processing Unit)) 11 for generally controlling the whole system. The processor 11 reads system programs stored in ROM (Read Only Memory) 12 via a bus 21 and executes control of the total of the controller 10 in accordance with the system programs. Further, RAM (Random Access Memory) 13 constituted by, for example, DRAM (Dynamic RAM) is temporarily stored with calculation data and display data.

CMOS (Complementary Metal Oxide Semiconductor) 14 is stored with machining programs and various parameters. Further, data stored to CMOS 14 includes a software (programs and related parameters) for executing processings related to vibration alarm in a mode mentioned later. CMOS 14 is backed up by a battery, not illustrated, and functions as an involatile memory in which data is not erased even when power supply of the controller 10 is made OFF.

An interface 15 is installed for carrying out input/output operation in respect with outside devices and is connected with an outside device 31 of an off-line programming apparatus or a printer. When a machining program is formed by an off-line programming apparatus, the data is read to the controller 10 via the interface 15. Data of a machining program edited by the controller 10 can be outputted by, for example, a printer.

A graphic control circuit 18 converts digital data of current positions of respective axes (4 axes), alarms, parameters and image data into image signals and outputs them. The image signals are transmitted to a display device 26 of a CRT/MDI (Cathode Ray Tube/Medium Dependent Interface) unit 25 and displayed on the display device 26. An interface 19 receives data from a keyboard 27 in the CRT/MDI unit 25 and transmits the data to the processor 11.

An interface 20 is connected to a manual pulse generator 32 and receives pulses from the manual pulse generator 32. The manual pulse generator 32 is mounted to a machine operation panel and can be used for manually moving and positioning movable portions of the machine main body including a work table.

Receiving operation command (movement command or rotation command) from the processor 11, axis control circuits 41 through 43 and a spindle control circuit 44 for an X-axis, a Y-axis, a Z-axis and a spindle shaft respectively, output current commands to servo amplifiers 51 through 53 and a spindle amplifier 54. The respective amplifiers supply power to servo motors MX, MY, MZ and a spindle motor MS in accordance with the current commands.

As mentioned later, the servo motors MX and MY drive an XY work table of the machine main body unit (mentioned later) and the servo motor MZ drives a tool mounting unit along a Z-axis direction. Further, the spindle motor MZ drives to rotate a machining tool (in this case, cutting tool) at an instructed rotational speed. Further, notation L1 is attached to a motor power line for supplying power to the servo motor MZ for later explanation.

Further, particularly according to a second embodiment and a third embodiment, there is adopted the axis control circuit 43 having a processing circuit outputting a request signal to a pulse coder 1 at a predetermined period, receiving a serial signal as a response therefrom and outputting to divide an angle detection signal, an alarm signal (caution is required since the alarm signal is not alarm in respect of vibration. For the details, refer to explanation of the second embodiment and the third embodiment in reference to FIG. 4 and FIG. 5) and an acceleration level signal, other than hardwares (servo CPU, memory etc) for normal servo control and softwares (including parameters of positioning loop gain and speed loop gain).

The angle detection signal is used as a normal feedback signal. In respect of the alarm signal and the acceleration level signal, they are temporarily transmitted to the processor 11 and are utilized in a processing for taking a necessary measure (content will be described later).

Notation 1 designates a pulse coder as a position detector attached to the servo motor MZ for driving the Z-axis and although illustration is omitted, the servo motors MX and MY (also the spindle motor MZ depending on cases) are also attached with pulse coders. Output pulses of the pulse coders are transmitted to the axis control circuits 41 through 43 respectively via signal lines for forming position feedback signals and feedback signals of speeds.

In order to apply the invention, an acceleration detection element is attached to at least one pulse coder. In this example, an acceleration detection element 2 is installed to the pulse coder 1 of the Z-axis (axis supporting a cutting tool) which is liable to undergo the strongest vibration. The acceleration detection element 2 as a vibration sensor converts acceleration which the pulse coder 1 receives into an electric signal and outputs the electric signal and there are following two systems in ways of dealing with the output signal in gross classification.

(1) The output signal is transmitted to an I/O (Input/Output) unit 17 via a signal line L3 designated by a broken line separately from an output from the pulse coder as the position detector (a detection signal in respect of angular position, speed and so on of axis. Hereinafter, represented by "angle detection signal".). Further, notation L2 designates a signal line used in transmitting the angle detection signal when this system is adopted.

(2) A signal line used in transmitting the angle detection signal from the pulse coder is used also for transmitting a signal in respect of acceleration of vibration provided from the acceleration detection element 2 or a signal produced by processing the former signal at inside of the pulse coder 1 (hereinafter, represented by "vibration level signal". It should be noted that the signal is not a derivation of a moving speed of the shaft with respect to time but is an amount representing a mechanical vibration state). In this case, the signal line L3 is not necessary.

An explanation will be given as follows by dividing embodiments into one embodiment (First Embodiment) in accordance with the system (1) and two embodiments (Second Embodiment and Third Embodiment) in accordance with the system (2).

(First Embodiment)

Figure 2:
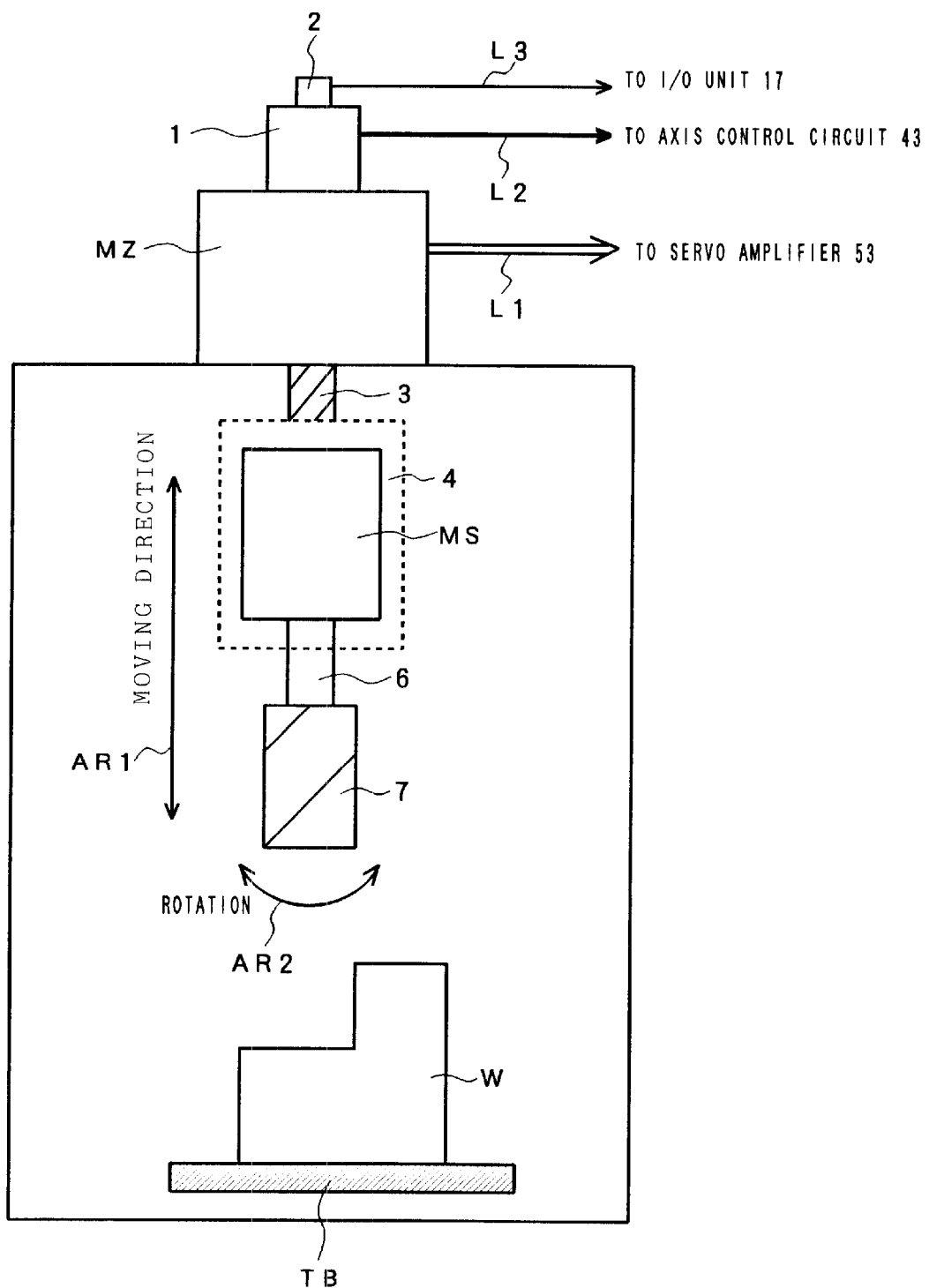
FIG. 2 is a view for explaining constitutions of essential portions of a main body unit of the machine according to a first embodiment.

FIG. 2 is a view for explaining constitutions of essential portions of the machine main body unit according to a first embodiment. As shown by the drawing, a ball screw 3 is coupled to the servo motor MZ supplied with power from the servo amplifier 53 (refer to FIG. 1) via the motor power line L1 and a cutting unit 4 mounted on a moving mechanism including the ball screw 3 is parallelly moved in a direction designated by a both way (direction of anode or cathode) arrow mark AR1. The cutting unit 4 is installed with the spindle motor MS for driving to rotate a cutting tool 7 via a spindle shaft 6 (refer to both way arrow mark AR2).

A workpiece W is positioned on an XY table TB driven by the servo motors MX and MY (refer to FIG. 1) illustration of which is omitted in the drawing and cutting operation by the cutting tool 7 is carried out. In carrying out machining, there is executed a control in which the cutting tool 7 is pushed to a portion of the workpiece W to be machined by the servo motor MZ while rotating the cutting tool 7 by the spindle motor MS.

In controlling the servo motor MZ, there is used a well-known servo control method in which a feedback signal is provided from the angle detection signal provided from the position detector (in this case, a pulse coder) 1 attached directly or indirectly to the motor shaft. According to the embodiment, the angle detection signal provided from the pulse coder 1 is transmitted to the axis control circuit 43 by using the exclusive signal line L2. The axis control circuit 43 is a well-known circuit installed with servo CPU, memory and so on and executes servo control in accordance with movement command received from the processor 11 and the feedback signal based on the angle detection signal provided by the pulse coder 1.

The feedback signal is utilized as a signal representing a current angular position and a current angular speed of the respective servo motor MZ in a positioning loop and a speed loop (only one of them depending on cases).

The above-described constitution and function is not particularly different from that of a conventional machine. The feature different from that of the conventional machine resides in that the acceleration detection element 2 is installed as a vibration sensor at a pertinent location of the pulse coder 1, an output signal therefrom (vibration level signal) is transmitted to the controller 10 (I/O unit 17) via the signal line L3 and it is monitored in the controller 10 whether abnormal vibration is caused in the pulse coder 1.

That is, when abnormal vibration is caused in the pulse coder 1 by factors such as wear or destruction of the cutting tool 7, inappropriate machining conditions, or accidental interference with the workpiece W (which can be caused by program error or runaway of Z-axis), the abnormal vibration is reflected to the vibration level signal outputted from the acceleration detection element 2 and a necessary measure is taken by software processing at inside of the controller 10. According to the processing, the state of operating the machine is changed in a direction of lowering the vibration level and the most typical and rapid change is "stoppage of the machine".

Figure 6:
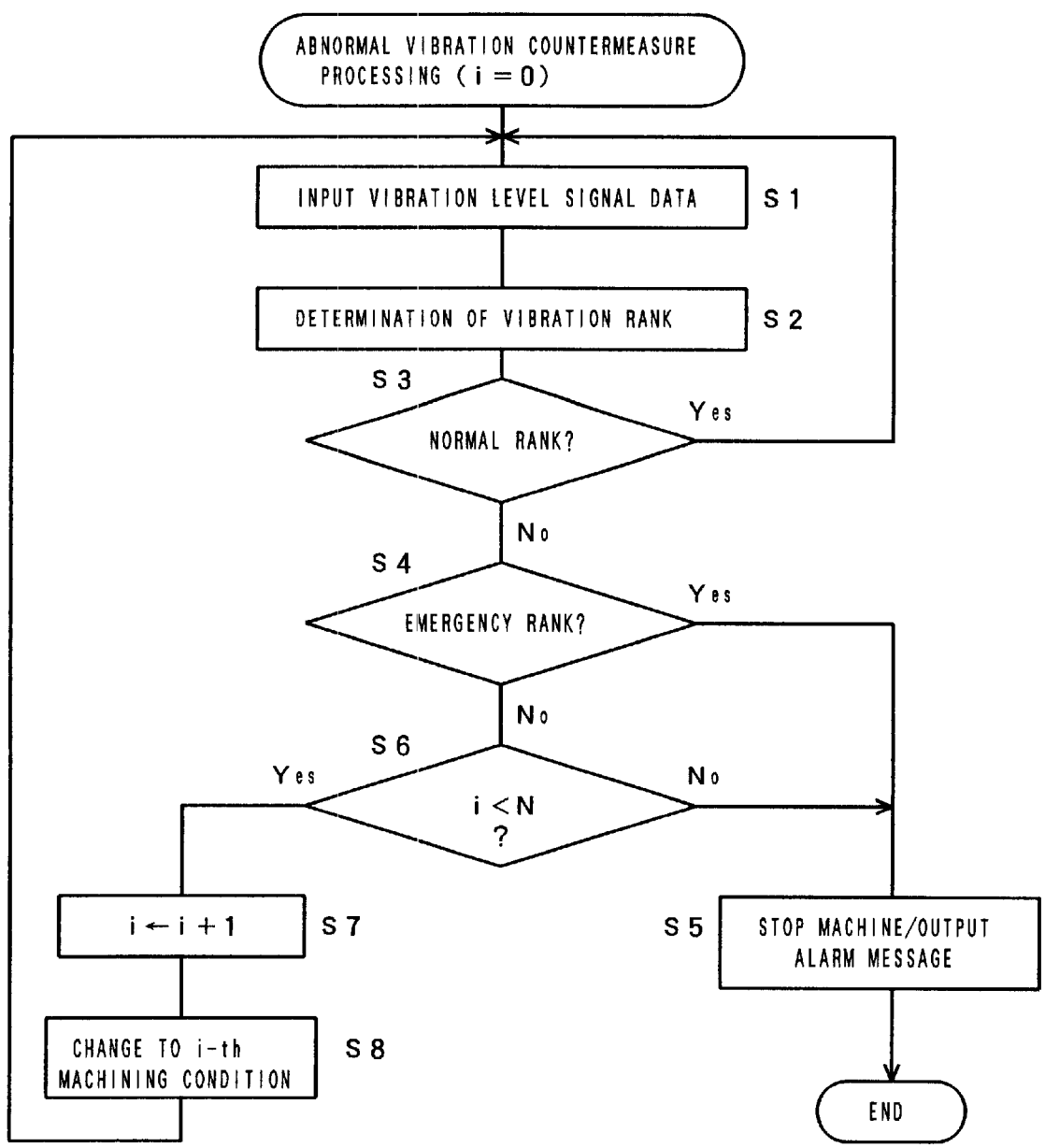
FIG. 6 is a flowchart for explaining an outline of a processing as a countermeasure against abnormal vibration in the respective embodiments.

FIG. 6 is a flowchart for explaining an example of a measure when abnormal vibration is detected and the gist of respective steps is as follows. As mentioned later, the processing is adopted also in the second embodiment and the third embodiment in a substantially similar mode.

Further, notation "i" in the flowchart designates an index in respect of a progressive change in a machining condition, an initial value thereof is designated by "O" (machining condition is not changed yet) and a saturation value thereof is designated by "N" (N; a total number of modified machining conditions). The index i is set to 1, 2, 3 ... N in an order which is conceived to be easy to cause vibration. As specific conditions to be changed, there are conceivable "rotational speed Vsp of the spindle motor", "feed speed Vz of the servo motor Mz" and "gain K of the positioning loop or the speed loop of the Z-axis".

A machining condition plan as shown by, for example, Table 1 shown below can be prepared by combining the change factors. According to the example, in respect of the elements Vsp, Vz and K, "normal values" and "alleviated values" smaller than the normal values are prepared and 3 stages (N=3) of changes in the machining conditions shown below can be carried out.

TABLE 1

| Index i | Vsp | Vz | K |
|---|---|---|---|
| 1 | Alleviated value | Normal value | Normal value |
| 2 | Alleviated value | Alleviated value | Normal value |
| 3 | Alleviated value | Alleviated value | Alleviated value |

Step S1; The operation inputs latest data of the vibration level signal transmitted to PC 16 via the signal line L3 and the I/O unit 17.

Step S2; The operation determines a rank of the vibration level signal. The rank is determined in accordance with the following 3 stages in this example.

A normal rank falls in a range in which abnormal vibration may be determined not to cause in the pulse coder 1.

A caution requiring rank falls in a range in which it is determined that although abnormal vibration is caused in the pulse coder 1, the abnormal vibration is not to a degree by which machining failure or accident (destruction of pulse coder or destruction of workpiece) is not immediately resulted and there remains a possibility of dealing therewith by changing machining conditions.

An emergency rank corresponds to a case in which it is determined that there causes in the pulse coder 1 abnormal vibration which may amount to machining failure or accident (destruction of pulse coder or destruction of workpiece).

Step S3; As a result of determining the vibration rank, in the case of the normal rank, the operation returns to step S1, otherwise proceeds to step S4.

Step S4; When the result of determining the vibration rank is at the emergency rank, the operation proceeds to step S5 and otherwise, proceeds to step S6.

Step S5; The operation brings the machine tool into emergency stop, carries out related processing such as displaying a message of emergency stop on the CRT display 26 and finishes the processing.

Step S6; The operation determines saturation/nonsaturation of the index i, in the case of saturation, the operation determines that there is no room of changing the machining condition and proceeds to step S5. In the case of nonsaturation, the operation proceeds to step S7.

Step S7; The operation increments the index i by 1.

Step S8; The operation changes the machining condition to an i-th machining condition in accordance with a previously prepared machining condition plan and returns to step S1. Further, step S1 may be executed after elapse of a time period to a degree which is conceived necessary to reflect the change of the machining condition to the vibrational level (for example, 1 second).

Further, although according to the level of determining the rank at step S2, a value in consideration of influence effected on the pulse coder is normally set as an initial value, the set value may be changed in consideration of a difference in transferring vibration owing to the rigidity of the machine or the machining condition. Further, a vibration value in operating the machine may be displayed on CRT and the set value may be changed in reference to the display value (refer to Fourth Embodiment mentioned below).

By the above-described processings, the machining condition can progressively be alleviated when detected abnormal vibration is to an inconsiderable degree capable of dealing therewith by changing the machining condition and the machine can be stopped when the abnormal vibration is to a considerable degree which needs emergency measure or when the abnormal vibration cannot be dealt with by alleviating the machining condition.

(Second Embodiment/Third Embodiment)

Figure 3:
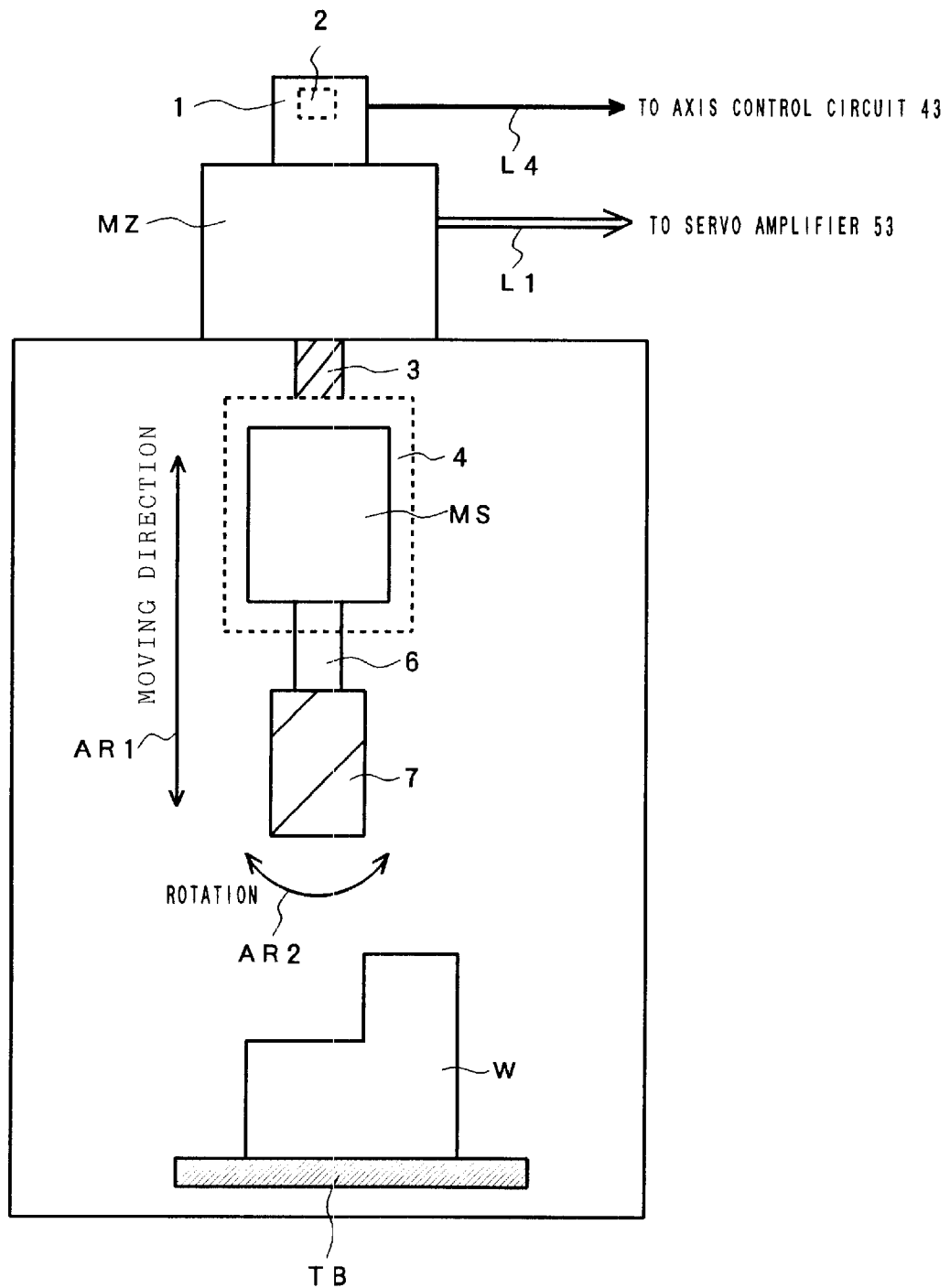
FIG. 3 is a view for explaining constitutions of essential portions of a main body unit of the machine according to a second embodiment and a third embodiment.

FIG. 3 is a view showing constitutions of essential portions of the machine main body unit according to a second embodiment and a third embodiment. As is understood by comparing the drawing with FIG. 2, except matters related to detection of vibration of the pulse coder 1, the constitution and the mechanism explained in the first embodiment in reference to FIG. 2 remain unchanged particularly and accordingly, a repeated explanation will pertinently be omitted and an explanation will be given centering on a point different from the first embodiment.

The feature common to the second embodiment and the third embodiment resides in that the acceleration detection element 2 is built in the pulse coder 1 attached to the servo motor MZ as the vibration sensor and an output signal (vibration level signal) therefrom is transmitted to the axis control circuit 43 of the controller 10 via a signal line L4 providing a transmission path common to that of the angle detection signal. The controller 10 acquires an angle and a vibration level by pertinently outputting a request signal to the pulse coder 1 via the axis control circuit 43 and the signal line L4.

By adopting such a method, the vibration sensor 2 is built in the position detector (in this case, the pulse coder 1) and there can be utilized the signal line L4 common to transmission of an output signal (angle output etc.) inherent to the position detector and transmission of an output signal from the vibration sensor.

A principal difference between the second embodiment and the third embodiment resides in content of the vibration level signal transmitted from the pulse coder 1 to the controller 10. Hence, an explanation will be given of an outline of signal processing executed in the pulse coder 1 in respect of the second embodiment and the third embodiment by centering on this point.

Figure 4:
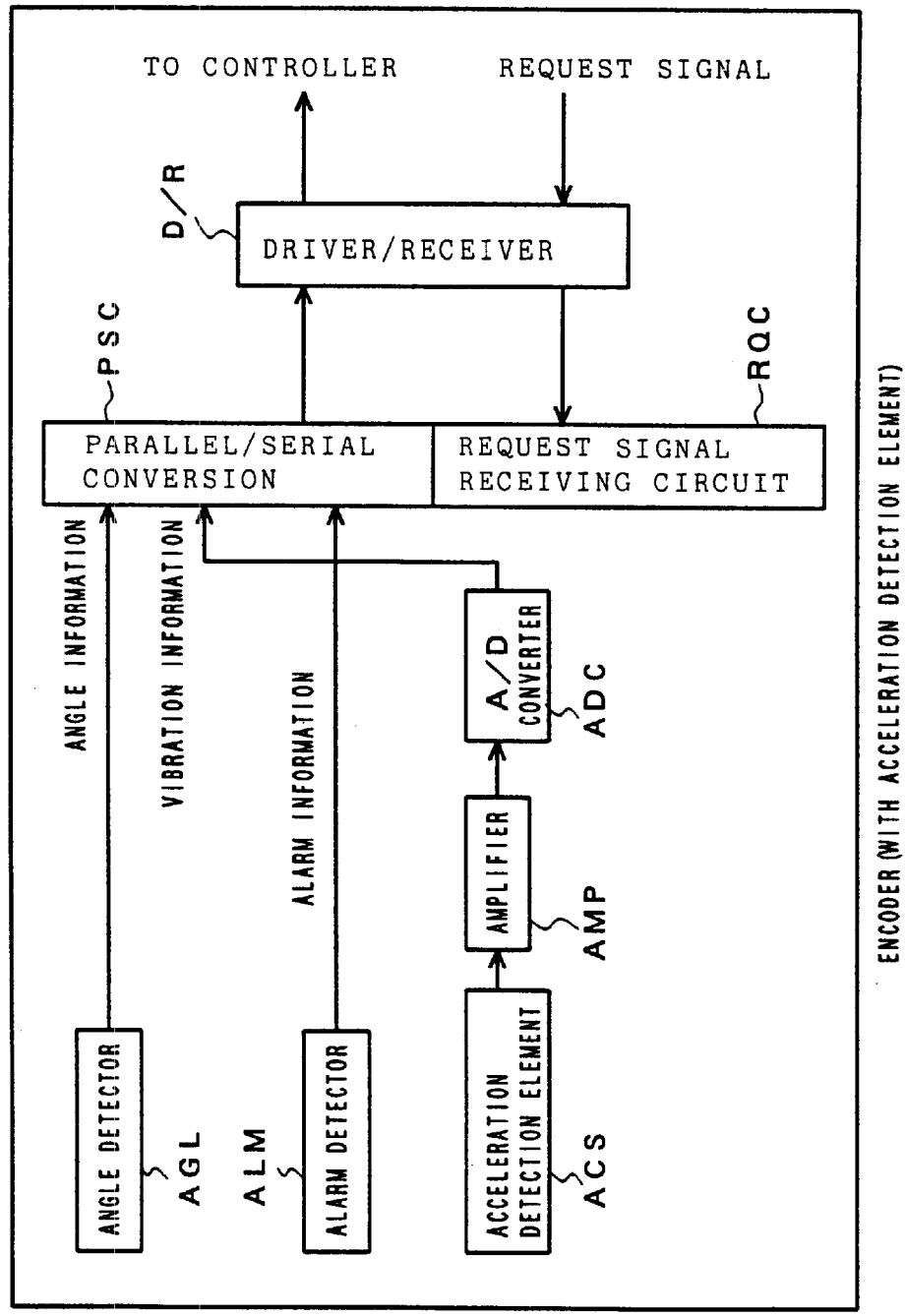
FIG. 4 is a block diagram for explaining an outline of signal processing in respect of a pulse coder adopted in the second embodiment.

FIG. 4 is a block diagram for explaining an outline of signal processing executed in the pulse coder 1 according to the second embodiment. As shown by the drawing, detection signals formed at inside of the pulse coder 1 incorporating the acceleration detection element 2, are an angle detection signal AGL based on the function inherent to the position detector, an alarm detection signal ALM in respect of the function inherent to the position detector (for example, signals representing abnormalities of an optical source element, an optical detector, a flip/flop circuit) and an acceleration detection element output signal ACS.

The angle detection signal AGL and the alarm detection signal ALM are respectively converted into serial signals by a parallel/serial conversion block PSC and is transmitted to the axis control circuit 43 of the controller 10 along with the angle detection signal via a driver/receiver D/R. The acceleration detection signal ACS is amplified by an amplifier circuit AMP, changed into a digital signal by an A/D (Analog to Digital) converter ADC, converted into a serial signal by the parallel/serial conversion block PSC and is transmitted to the axis control circuit 43 of the controller 10 via the driver/receiver D/R.

Now, when a request signal receiving circuit RQC receives a request signal, a newest output from the A/D converter ADC is converted into a serial signal by the parallel/serial conversion block PSC and is transmitted to the axis control circuit 43 of the controller 10 along with the angle detection signal via the driver/receiver D/R. The axis control circuit 43 converts the serial signal into the normal digital signal and transmits it to the processor 11.

The processor 11 executes a processing for taking a pertinent measure in accordance with the vibration level signal simultaneously with processing the angle detection signal. According to the processing, similar to the processing executed in the first embodiment, the operational state of the machine is changed in the direction of lowering the vibration level.

An explanation can be given of an outline of a specific processing also in reference to the flowchart of FIG. 6. However, in respect of the steps, an explanation for the second embodiment is added by taking note of a point of slight difference in view of the details.

Step S1: The operation outputs the request signal to the pulse coder 1 via the axis control circuit 43 and inputs newest data of the vibration level signal transmitted along with the angle detection signal via the signal line L4 and the axis control circuit 43.

Step S2; The operation determines a rank of the vibration level signal. Similar to the first embodiment, the rank is determined by 3 stages of "normal rank", "caution requiring rank" and "emergency rank". The definitions of the respective ranks are the same as those mentioned in the description of the first embodiment.

Step S3; When the rank is the normal rank as a result of determining the rank of vibration, the operation returns to step S1 and otherwise proceeds to step S4.

Step S4; When the result of determining the rank of vibration is the emergency rank, the operation proceeds to step S5 and otherwise proceeds to step S6.

Step S5; The operation brings the machine into emergency stop, carries out a related processing such as displaying a message of emergency stop on the CRT display 26 and finishes the processing.

Step S6; The operation determines saturation/nonsaturation of the index i, determines that there is no room of changing the machining condition in the case of saturation and proceeds to step S5. In the case of nonsaturation, the operation proceeds to step S7.

Step S7; The operation increments the index i by 1.

Step S8; The operation changes the machining condition to an i-th machining condition in accordance with a previously prepared machining condition plan and returns to step S1. In that case, there may be carried out a processing such as skipping to read the acceleration detection signals in respect of the request signals periodically outputted by a predetermined number of times in consideration of the fact that more or less time period is required in reflecting the change of the machining condition to the vibration level.

Further, with regard to the machining condition plan, the plan shown in Table 1 used in the first embodiment can be used.

By the above-described processing, similar to the case of the first embodiment, when the detected abnormal vibration is to an inconsiderable degree which can be dealt with by changing the machining condition, the machining condition is progressively alleviated, further, the machine can be stopped when the abnormal vibration is to a considerable degree requiring emergency or when the abnormal vibration cannot be dealt with by alleviating the machining condition.

Next, FIG. 5 is a block diagram for explaining an outline of signal processing which is carried out in the pulse coder 1 in respect of the third embodiment. As shown by the drawing, similar to the second embodiment, detection signals formed at inside of the pulse coder 1 incorporating the acceleration detection element 2, are the angle detection signal AGL based on the function inherent to the position detector, the alarm detection signal ALM in respect of the function inherent to the position detector (for example, signals representing abnormalities of an optical source element, an optical detector, a flip/flop circuit etc.) and the acceleration detection element output signal ACS.

The angle detection signal AGL and the alarm detection signal ALM are converted into serial signals respectively by the parallel/serial conversion block PSC and are transmitted to the axis control circuit 43 of the controller 10 via the driver/receiver D/R. The acceleration detection signal ACS is compared with 2 stages of reference voltages v1 and v2 (v1<v2) by a comparator circuit CMC. A result of comparison is outputted by a signal represented by 3 stages, converted into a serial signal by the parallel/serial conversion block PSC and is transmitted to the axis control circuit 43 of the controller 10 via the driver/receiver D/R.

The reference voltages v1 and v2 are set to be compatible with a countermeasure processing in detecting abnormal vibration executed by the controller 10 (mentioned later; the explanation has already been given to the first embodiment and the second embodiment). In this case, the level of the signal ACS is designated by notation v and the reference voltages are set as follows.

v<v1; a range representing normal rank
v1≦v<v2; a range representing caution requiring rank
v2≦v; a range representing emergency rank The output from the comparator circuit CMC representing the respective rank is converted into certain bits in the serial signal allocated to the vibration level signal and is transmitted to the axis control circuit 43 of the controller 10 via the signal line L4 immediately after the driver/receiver D/R receives the request signal. The axis control circuit 43 converts the serial signal into a normal signal and transmits it to the processor 11 as the vibration level signal.

The processor 11 executes a processing for taking a countermeasure in accordance with the vibration level signal. According to the processing, similar to the processing executed in the first embodiment or the second embodiment, the processing changes the operational state of the machine in the direction of lowering the vibration level. An outline of specific content of the processing is the same as that of the second embodiment explained also in reference to the flowchart of FIG. 6 and accordingly, the repeated explanation will be omitted.

However, determination of the rank in respect of vibration level signal has substantially being completed on the side of the pulse coder 1 and therefore, the processing which is carried out in step S2 through step S4 according to the embodiment may be a processing of reading data (rank data) representing a result of rank determination. Therefore, according to the embodiment, in the flowchart of FIG. 6, "determine rank" at step S2 is changed to read "read rank data".

That is, while according to the second embodiment explained above, the vibration level signal transmitted from the pulse coder 1 to the controller 10 represents information for rank classification (ranking to determine what degree of vibration level is produced) for selecting a countermeasure against vibration (change of machining condition, stoppage of machine), according to the embodiment, the vibration level signal transmitted from the pulse coder 1 to the controller 10 includes information (rank data) representing a result of ranking executed for selecting a countermeasure against vibration.

In this way, also according to the embodiment, the processing of a countermeasure against vibration similar to that of the first embodiment or the second embodiment is carried out, when the detected abnormal vibration is to an inconsiderable degree which can be dealt with by changing the machining condition, the machining condition is progressively alleviated, further, the machine can be stopped when the abnormal vibration is to a considerable degree requiring emergency or when it is determined that the abnormal vibration cannot be dealt with by alleviating the machining condition.

Although according to the above-described embodiments, an explanation has been given of the example in which the vibration sensor is installed with regard to the position detector of the axis for parallelly moving the cutting tool, the axis installed with the vibration sensor in the position detector may be other axis, further, vibration sensors may be installed in respect of position detectors of a plurality of axes. In the latter case, it is also conceivable to take a variety of processings as a countermeasure against vibration (change of machining condition, stoppage of machine) in accordance with what rank of vibration is detected at which axis of the position detector.

Further, although according to the above-described embodiments, the degree of abnormality of vibration which the position detector undergoes is determined by classifying the detected vibration level (instantaneous value) in ranges, the determination may be carried out by adding a time factor thereto. Hence, an explanation will be given of an example of determining normality/abnormality by monitoring a duration time of vibration exceeding a reference level as a fourth embodiment and an explanation will be given of an example of determining normality/abnormality by monitoring an accumulated time period of vibration exceeding a reference level as a fifth embodiment.

According to the explanation of the two embodiments, the reference level is designated by notation G and the detected vibration level is designated by notation g. Although the reference level G is previously set to the controller 10 respectively in the fourth embodiment and the fifth embodiment, a set value thereof can also be changed at an arbitrary time point as necessary.

Further, according to the two embodiments, as a block constitution for signal processing, there may be adopted either of types of FIG. 4 (comparison is executed with the reference level on the side of the controller) and FIG. 5 (comparison is executed with the reference level on the side of the position detector) and functions of the respective blocks are the same as those explained in the first embodiment through the third embodiment and accordingly, a repeated explanation of inputting the vibration level signal or the like will be omitted.

(Fourth Embodiment)

A flowchart of FIG. 7 is a flowchart describing an outline of a processing according to the embodiment. Essential points of respective steps are as follows. The processing is started by setting a processing cycle index j at an initial value (j=0).

Step Q1; The operation inputs newest data (g) with regard to the vibration level.

Step Q2; The operation displays the inputted vibration level data (g) at CRT 26. Although the display can be carried out in an arbitrary mode of a display of numerical values or a graphic display, it is preferable to constitute a display mode capable of optically recognizing a relationship between the vibration level data (g) and the reference level G (for example, % display of g/G value).

Step Q3; When the vibration level data (g) does not exceed the vibration reference level (G), the operation proceeds to step Q4 and proceeds to step Q5 when the vibration level data (g) exceeds the vibration reference level (G).

Step Q4; The operation clears the processing cycle index j and sets it to j=0.

Step Q5; When a current value of the processing cycle index j does not exceed a set value N, the operation proceeds to step Q6 and proceeds to step Q7 when the current value exceeds the set value N.

Step Q6; The operation adds 1 to the processing cycle index j and returns to step Q1.

Step Q7; The operation determines that a duration time period of a state in which the vibration level data (g) exceeds the reference vibration level (G), exceeds an allowable duration time period (N) measured by summing up the processing cycle index j, displays a message of the determination at the CRT display 26 and stops the machine.

Further, in the processing illustrated by FIG. 7, the duration time period of the vibration state in which the reference level (G) is exceeded is measured by summing up the processing cycle index j, since time periods required in cycles starting from step Q1 and returning to step Q1 via step Q4 (clear j value) and step Q6 (addition of 1 to j value), remain substantially constant as processing periods.

Now, when a state of not exceeding the reference level (G) is shifted to a state of exceeding it, cycles of . . . → step Q3→step Q4→step Q5→step Q6→step Q1→step Q2→ . . . are continuously repeated and the j value is incremented by 1. When the state of exceeding the reference level (G) continues with no interruption, the j value finally exceeds the allowable value N and accordingly, the operation proceeds from step Q5 immediately thereafter to step Q7 and takes a measure of stopping the machine or the like.

Further, when a determination of NO is carried out at step Q3 even by once before the j value exceeds the allowable value N, the j value is cleared at step Q4 and the j value returns to the initial value 0. According to the embodiment, an abnormal vibration state in which the signal is detected in a short period of time as in noise can be excluded.

(Fifth Embodiment)

A flowchart of FIG. 8 is a flowchart illustrating an outline of a processing according to the embodiment. Essential points of respective steps are as follows. The processing is started by setting the processing cycle index j to an initial value j=0).

Step R1; The operation inputs newest data (g) with regard to the vibration level.

Step R2; The operation returns to step R1 when the vibration level data (g) does not exceed the vibration reference level (G) and proceeds to step R3 when the vibration level data (g) exceeds the vibration reference level (G).

Step R3; When a current value of the processing cycle index j does not exceed the set value M, the operation proceeds to step R4 and proceeds to step R5 when the current value exceeds the set value M.

Step R4; The operation adds 1 to the processing cycle index j and returns to step R1.

Step R5; The operation determines that a summed-up time period of a state where the vibration level data (g) exceeds the reference vibration level (G), exceeds an allowable summed-up time period (M) measured by summing up the processing cycle index j and displays a message of interchanging a tool or the like at the CRT display 26. Depending on cases, the operation may stop the machine.

Further, in the processing described by FIG. 8, the summed-up time period of the vibration state in which the reference level (G) is exceeded, is measured by summing up the processing cycle index j, since time periods required in cycles starting from step R1 and returning to step R1 via step R2 (g is equal to or smaller than G) or step R4 (addition of 1 to j value), remain substantially constant as processing periods.

Now, when a state of not exceeding the reference level (G) is shifted to a state of exceeding the reference level (G), cycles of . . . →step R2→step R3→step R4→step R2→ . . . are repeated and the j value is incremented by 1. When the state continues with no interruption, the j value finally exceeds the allowable value M and the operation proceeds from step R3 immediately thereafter to step R5. Further, even when the state of g>G is interrupted, the j value is not cleared, different from the fourth embodiment (refer to FIG. 7) (however, j value can be forcibly cleared by a separate manual input) and accordingly, when the operation returns again to the state of g>G, a further increase in the j value is restarted. In this way, the abnormal vibration summed-up time period is measured and arrival of time of interchanging a tool or the like is outputted by a message.

According to the invention, there can be detected precisely abnormal vibration caused in a position detector which is liable to undergo influence of vibration and which is very important in maintaining machining accuracy of a machine and a required measure can immediately be taken. Therefore, there can be prevented beforehand a situation in which machining accuracy is significantly deteriorated by the abnormal vibration caused in the position detector, or the position detector per se is resulted in destruction accident.

Further, several of measures selected in detecting abnormal vibration are previously prepared in the controller and can flexibly be dealt with in accordance with a degree of the detected abnormal vibration.

Further, when a vibration sensor is built in the position detector and a signal line common to transmission of an output signal (angle output) inherent to the position detector and transmission of the vibration sensor, is utilized, there is achieved an advantage in which a number of signal lines connecting the controller and a machine main body unit needs not to increase.

What is claimed is:

1. An industrial machine comprising a mechanical section driven by at least one of a servomotor and a spindle motor, and a control section for controlling said mechanical section, characterized in that a vibration sensor comprises an acceleration detection element and is provided at at least one of said servomotor, a detector for detecting at least one of a position and a speed of said servomotor, and a mechanical portion connected with at least one of said servomotor and said spindle motor with respect to at least one axis driven by said servomotor and said spindle motor, wherein information representing a vibration obtained by a signal detected by said vibration sensor is transmitted to said control section.

2. An industrial machine according to claim 1, wherein said control section comprises determining means for determining whether or not a signal detected by said vibration sensor is an abnormal vibration based on said information, and dealing means for taking measures against the abnormal vibration when a determination result which means a detection of the abnormal vibration is obtained by said determining means.

3. An industrial machine according to claim 1, wherein said detector comprises determining means for determining whether or not the vibration is an abnormal vibration based on the signal detected by said vibration sensor, and information of result of said determining means is transmitted to said control section, and said control section comprises means for taking measures against an abnormal vibration when said information indicates an abnormal vibration.

4. An industrial machine according to claim 1, wherein said electric motor is a servomotor for moving a spindle of the industrial machine in an axial direction thereof.

5. An industrial machine according to claim 1, wherein said electric motor is a spindle motor for rotatively driving a spindle of the industrial machine.

6. An industrial machine according to claim 1, wherein said electric motor is a servomotor for moving a table of the industrial machine.

7. An industrial machine according to claim 1, further comprising a detector for detecting a position and/or speed of said electric motor, wherein said vibration sensor is provided at said detector.

8. An industrial machine according to claim 7, wherein said detector comprises determining means for determining whether or not the vibration of said axis detected by said vibration sensor is abnormal, said signal includes information on determination result of said determinating means, and said controller comprises adjusting means for adjusting the vibration to reduce when the determination result indicates that the vibration is abnormal.

9. An industrial machine according to claim 8, wherein said adjusting means reduces the vibration by stopping an operation of the industrial machine.

10. An industrial machine according to claim 8, wherein said adjusting means reduces the vibration by changing rotational speed of a spindle motor for rotatively driving a spindle of the industrial machine.

11. An industrial machine according to claim 8, wherein said adjusting means reduces the vibration by changing rotational speed of a servomotor for moving a spindle of the industrial machine in an axial direction thereof.

12. An industrial machine according to claim 8, wherein said adjusting means reduces the vibration by changing a position or speed loop gain of a control circuit for a servomotor for moving a spindle in the axial direction thereof.

13. An industrial machine according to claim 1, wherein said controller comprises determining means for determining whether or not the vibration of said axis is abnormal based on the information included in said signal, and adjusting means for adjusting the vibration to reduce when the vibration is determined to be abnormal by said determining means.

14. An industrial machine according to claim 13, wherein said adjusting means reduces the vibration by stopping an operation of the industrial machine.

15. An industrial machine according to claim 13, wherein said adjusting means reduces the vibration by changing rotational speed of a spindle motor for rotatively driving a spindle of the industrial machine.

16. An industrial machine according to claim 13, wherein said adjusting means reduces the vibration by changing rotational speed of a servomotor for moving a spindle of the industrial machine in an axial direction thereof.

17. An industrial machine according to claim 13, wherein said adjusting means reduces the vibration by changing a position or speed loop gain of a control circuit for a servomotor for moving a spindle in the axial direction thereof.

18. An industrial machine comprising:
  an electric motor for driving an axis provided for a moveable part of the industrial machine;
  a controller for controlling said electric motor;
  a vibration sensor for detecting a vibration of the axis for said moveable part, said vibration sensor comprising an acceleration detection element; and
transmitting means for transmitting a signal including information on the vibration detected by said vibration sensor.

* * * * *